Sept. 23, 1947.          L. COOPER                2,427,715
                        FISH STRINGER
                     Filed April 2, 1946
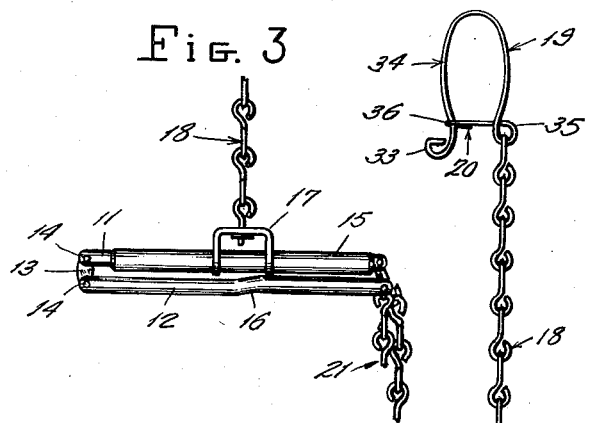
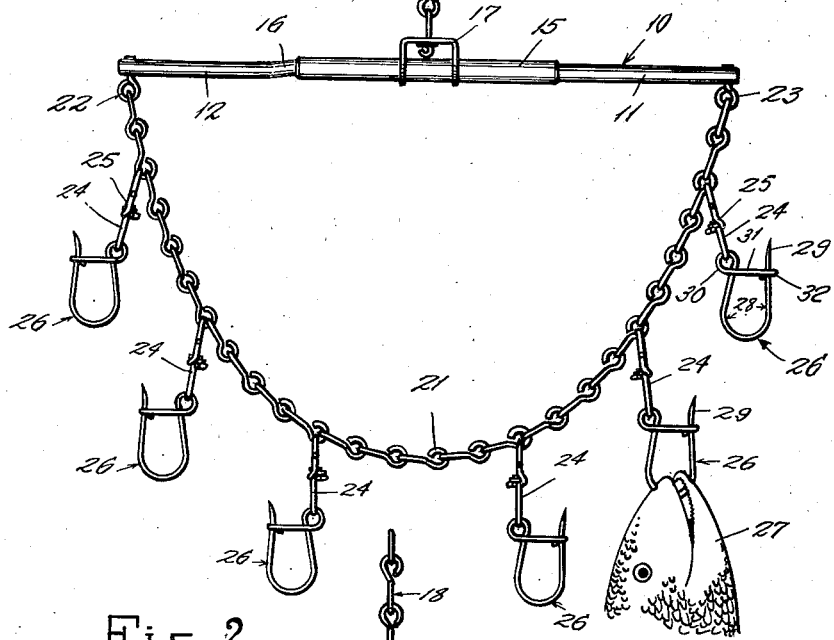
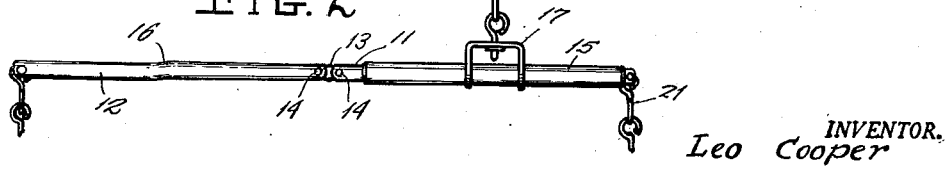
INVENTOR.
Leo Cooper
BY
Johnson, Kline and Hensel
ATTORNEYS Patented Sept. 23, 1947

2,427,715

UNITED STATES PATENT OFFICE 2,427,715

FISH STRINGER

Leo Cooper, Stamford, Conn.

Application April 2, 1946, Serial No. 658,909

5 Claims. (Cl. 224—7)

1

This invention relates to an improved fish stringer for suspending fish from the gunwale of the boat or the side of a wharf.

It has been suggested heretofore to provide a series of hooks on a chain, the hooks being adapted to be inserted through the mouth of the fish in order to suspend it from the chain, and the chain having means for suspending it from the side of the boat or wharf. When held in this manner, the fish live relatively longer than if a stringer is passed through their gills. By spacing the hooks at intervals on the chain, the fish are prevented from bunching together.

However, in the constructions heretofore proposed for fish stringers of the aforesaid type, the chain extends its full length into the water so that when a substantial number of fish are suspended therefrom the chain may drag on the bottom, get caught in weeds, or suspend the fish so far from the boat or wharf that they would be eaten by other fish.

It is an object of this invention to provide a fish stringer having means for suspending a relatively large number of fish from a chain while, at the same time, holding the chain in such a manner that it will not extend a substantial distance into the water so as to drag on the bottom or permit fish suspended therefrom to be eaten by others.

It is also an object of the invention to provide a stringer of the aforesaid type which can be readily folded together for storage in a tackle box when not in use.

In accordance with my invention the foregoing objects are accomplished by providing a rigid support in the form of a bar, adapted to be suspended intermediate its ends from the side of a boat or wharf and having a chain provided with a series of fish-engaging hooks, opposite ends of the chain being attached respectively to opposite ends of the rigid support. When the chain is suspended in this manner, it assumes the form of a catenary in the water, and the hooks attached at spaced intervals on the chain are held apart so that the fish do not bunch together. Moreover, as compared with stringers heretofore proposed in which the chain extends lengthwise into the water, a stringer constructed in accordance with this invention extends less than half the distance into the water. In order to permit the stringer to be reduced to compact form for storing in a tackle box, the rigid bar constituting the support member is constructed to be collapsible at its midpoint and releasable means are provided for holding it against collapsing while in use.

A preferred embodiment of a stringer in accordance with my invention is illustrated in the accompanying drawings, wherein:

Figure 1 is a front elevation of the stringer set up for use.

Fig. 2 is a detail of the collapsible support bar and releasable means for holding it in extended position.

Fig. 3 is a detail of the support bar in collapsed condition for storage.

Referring to the drawings, the stringer comprises a support bar 10 comprising two sections 11 and 12 of substantially equal length, advantageously constructed of metal rod, the ends of the two sections being interconnected by a link 13 secured to the sections by means of pivots 14. The two sections 11 and 12 are thus collapsible at the link 13 as a hinge. A metal sleeve 15 slidably engages section 11 and is slidable over the link 13 and partway over the adjoining portion of section 12. When the sleeve 15 is moved across the link 13 so as to engage section 12 as well as section 11, it maintains the two sections in rigidly extended position for use as shown in Fig. 1.

In order to position the sleeve 15 substantially centrally over the link 13, section 12 is formed with a slight offset 16 intermediate its ends, the offset constituting a stop means for preventing movement of the sleeve 15 beyond this point.

At the midpoint of sleeve 15, the latter carries a clip 17, which may be formed as shown from metal strip bent into U-shape. The clip 17 occupies a position substantially equidistant from the outer ends of sections 11 and 12 when the sleeve 15 is positioned centrally over the link 13, to align the two sections, as shown in Fig. 1. A chain 18 is attached at one end to clip 17, its opposite end having a hook 19 including keeper 20 for attaching the ring to the oarlock or gunwale of a boat or other suitable attaching means on a wharf or boat.

A chain 21 is attached at its opposite ends, respectively, to a pair of eyelets 22 and 23 carried by the outer ends of sections 11 and 12 of the rod 10. Thus, when the rod 10 is suspended from a support by means of chain 18, the chain 21 hangs as a catenary from the ends of the rod. A plurality of eyelets 24 are provided at spaced intervals along the chain 21, the eyelets being attached to the chain by means of swivels 25. From each of said eyelets a hook 26 is suspended, adapted to receive a fish 27 to be attached to the stringer. The hooks 26 are preferably constructed of resilient wire bent into a U-shaped hook portion 28, the outer or free end 29 being sharpened to facilitate insertion thereof through the mouth of a fish. At the opposite or inner end of the U-shaped hook portion 28, a loop 30 is formed, adapted to engage an eyelet 24 attached to the chain 21. From the loop 30 the opposite end 31 of the wire extends transversely across the upper portion of the hook 28 and is provided with a reverse bend 32 to engage the sharpened end 29 of the hook, as a keeper.

The hook 19 at the upper end of chain 18 is of similar construction, except that the outer end 33 of the hook is blunt. The U-shaped hook portion 34 terminates at its inner end in the loop 35 from which the keeper 20 extends transversely across the open portion of the hook, and is provided with a reverse bend 36 for engaging the free end of the hook, as shown.

When the fish stringer in accordance with this invention is set up for use, as shown in Fig. 1, the sleeve 15 is positioned substantially centrally intermediate the outer ends of rigid sections 11 and 12, both sections being engaged thereby and held in extended aligned position. The stop means provided by offset 16 intermediate the ends of section 12 serves to position the sleeve 15 centrally on the bar; clip 17, being centrally attached to sleeve 15, suspends the bar 10 from chain 18. The chain 21 attached at opposite ends of the bar thus hangs in the form of a catenary, maintaining the hooks 26, suspended therefrom, in desired spaced relation. As compared with stringers heretofore proposed having an equal number of hooks attached at similar intervals to a chain of equal length, the stringer in accordance with this invention extends less than half as far into the water. Should the weight of the fish on chain 25 be unbalanced so as to pull down one end of the rigid bar 10, the opposite end will rise, thus retaining the chain 21 against further extension into the water.

When it is desired to collapse the stringer for storage, sleeve 15 is slid toward the outer end of section 11 until it no longer covers link 13, as shown in Fig. 2. The pivotal connections between the link 13 and sections 11 and 12 are thereby released, and section 12 can be folded against section 11 to the position shown in Fig. 3. When thus folded, the stringer is reduced to a conveniently compact form, adapted to be stored in a tackle box.

Variations and modifications may be made within the scope of this invention and portions of the improvements may be used without others.

I claim:

1. A fish stringer comprising a bar having a pair of rigid sections, joined together at their ends for movement between extended and collapsed position; releasable means for holding the two sections in extended position; a chain having a plurality of fish-receiving hooks attached at spaced intervals thereto, the opposite ends of said chain being attached respectively to the outer ends of said bar; a second chain having one end attached to said releasable means intermediate the ends thereof; and means at the opposite end of the latter chain for attaching the same to a support.

2. A fish stringer comprising a bar having a pair of rigid sections hinged together at their ends for movement between aligned and collapsed position; a sleeve surrounding one of said sections and slidable part way over the adjacent end of the other section for holding the two sections in aligned condition; a chain having a plurality of fish-receiving hooks attached at spaced intervals thereto, the opposite ends of said chain being attached respectively to the outer ends of said sections; a second chain having one end attached to said sleeve intermediate the ends thereof; and means at the opposite end of the latter chain for suspending the same from a support.

3. A fish stringer comprising a bar having a pair of rigid sections of equal length hinged together at their ends for movement between aligned and collapsed position; a sleeve surrounding one of said sections, and slidable partway over the hinged end of the other section for holding the two sections in aligned condition; stop means intermediate the ends of the latter section for positioning said sleeve centrally over the hinge between the two sections; a chain having a plurality of fish-receiving hooks attached at spaced intervals thereto, the opposite ends of said chain being attached respectively to the outer ends of said sections; a second chain having one end attached to said sleeve intermediate the ends thereof; and means at the opposite end of the latter chain for suspending the same from a support.

4. A fish stringer comprising a bar having a pair of rigid sections; a link pivotally joined to adjacent ends of said section and forming a hinge about which the two sections are movable between aligned and collapsed position; a sleeve surrounding one of said sections and slidable over said link and the adjacent end of the other section to hold said sections in aligned position, the latter section having an offset intermediate the ends thereof forming a stop means for positioning said sleeve centrally over said link; a chain having a plurality of fish-engaging hooks attached at spaced intervals thereto, said hooks having a sharp point for insertion through the mouth of a fish, opposite ends of said chain being attached respectively to the outer ends of said sections of the bar; a second chain secured to said sleeve at the midpoint thereof; and a hook at the opposite end of the latter chain for suspending the same from a support on a boat or wharf.

5. A fish stringer comprising a bar having a pair of rigid sections, joined together at their ends for movement between extended and collapsed position; releasable means for holding the two sections in extended position; a chain having a plurality of fish-receiving hooks attached at spaced intervals thereto, the opposite ends of said chain being attached respectively to the outer ends of said bar; and flexible means for supporting said bar from a support.

LEO COOPER.

REFERENCES CITED

The following references are of record in the file of this patent:

UNITED STATES PATENTS

| Number | Name | Date |
|---|---|---|
| 431,859 | Traut | July 8, 1890 |
| 458,018 | Curtis | Aug. 18, 1891 |
| 1,407,221 | Reimers | Feb. 21, 1922 |

FOREIGN PATENTS

| Number | Country | Date |
|---|---|---|
| 187,372 | Great Britain | Oct. 26, 1922 |